_United States Patent Office_

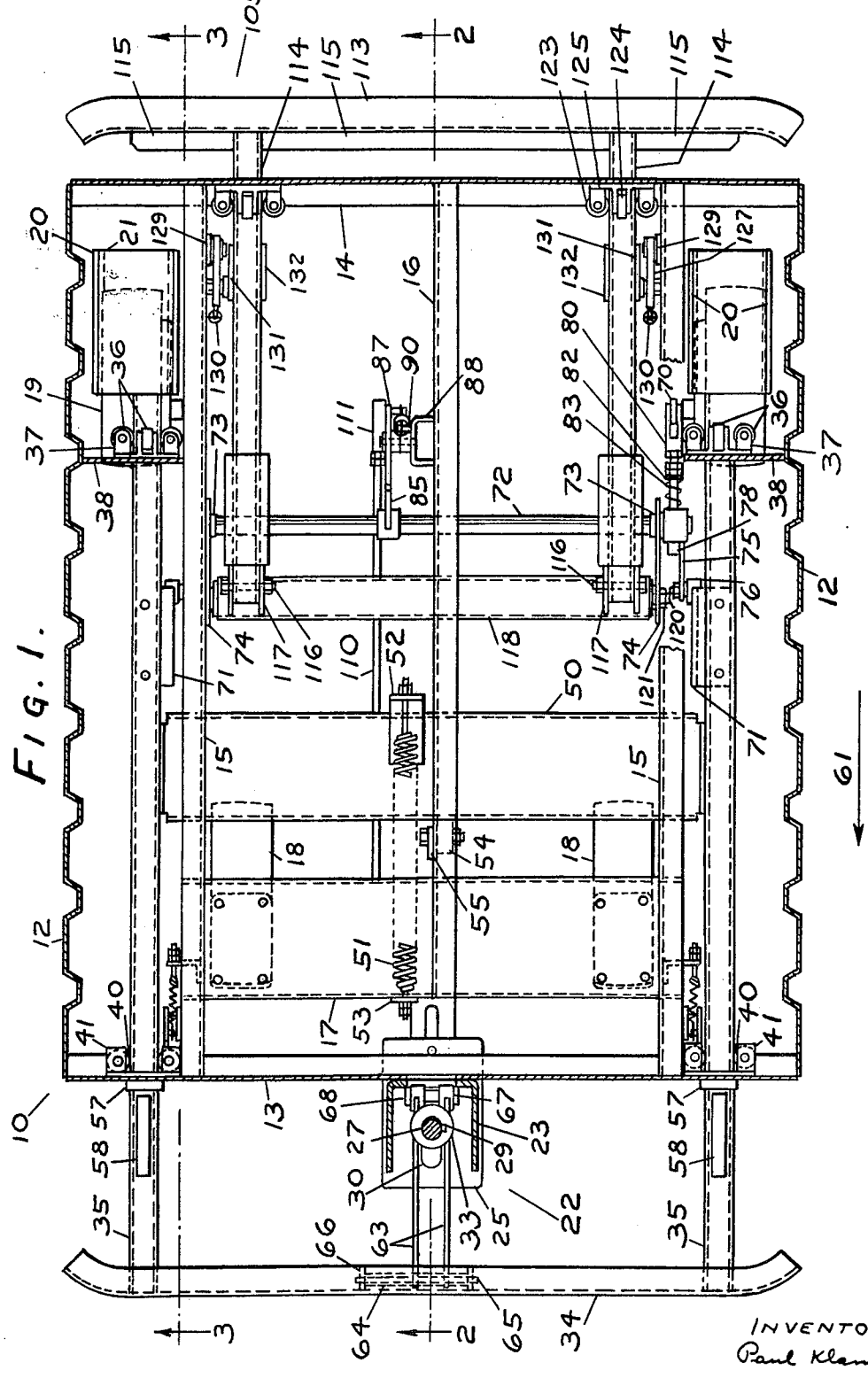

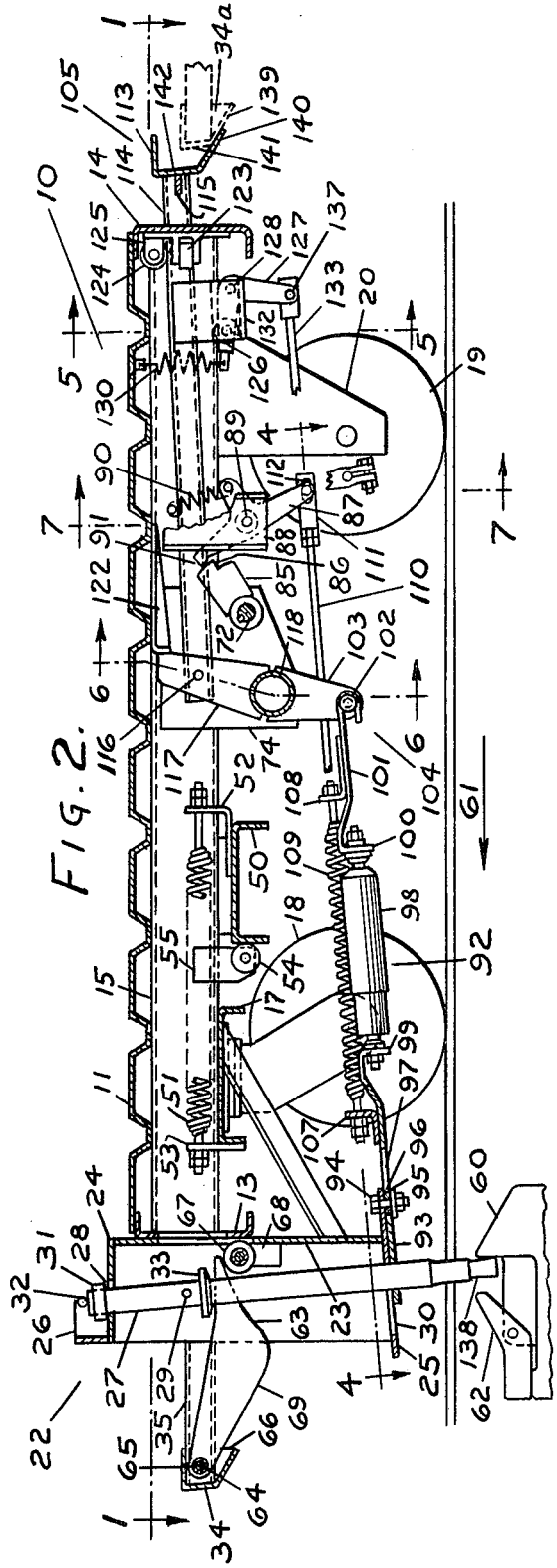

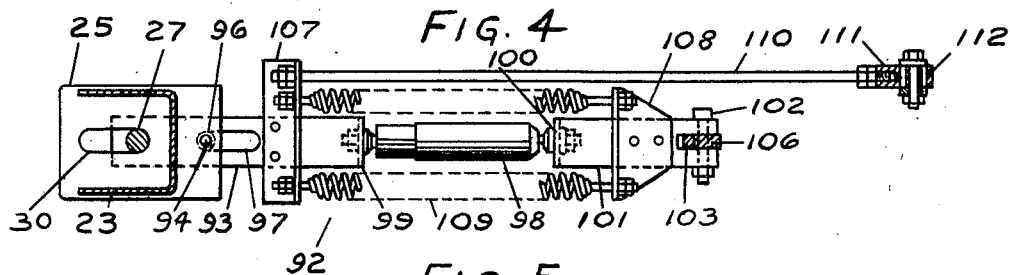
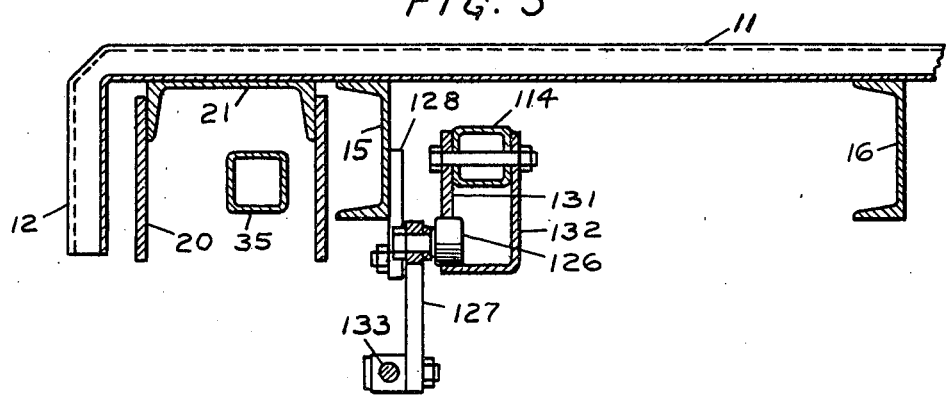
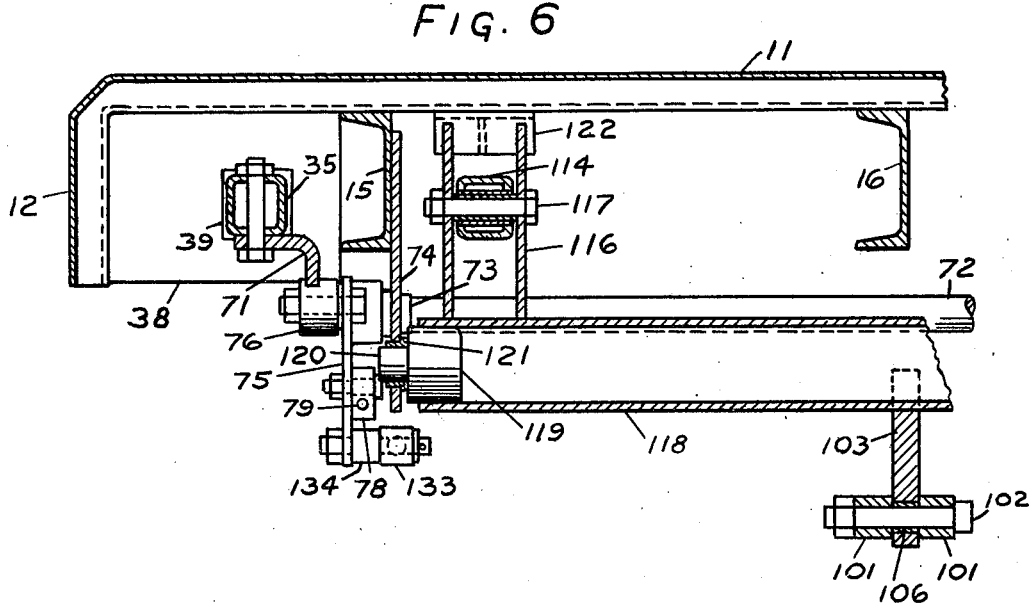

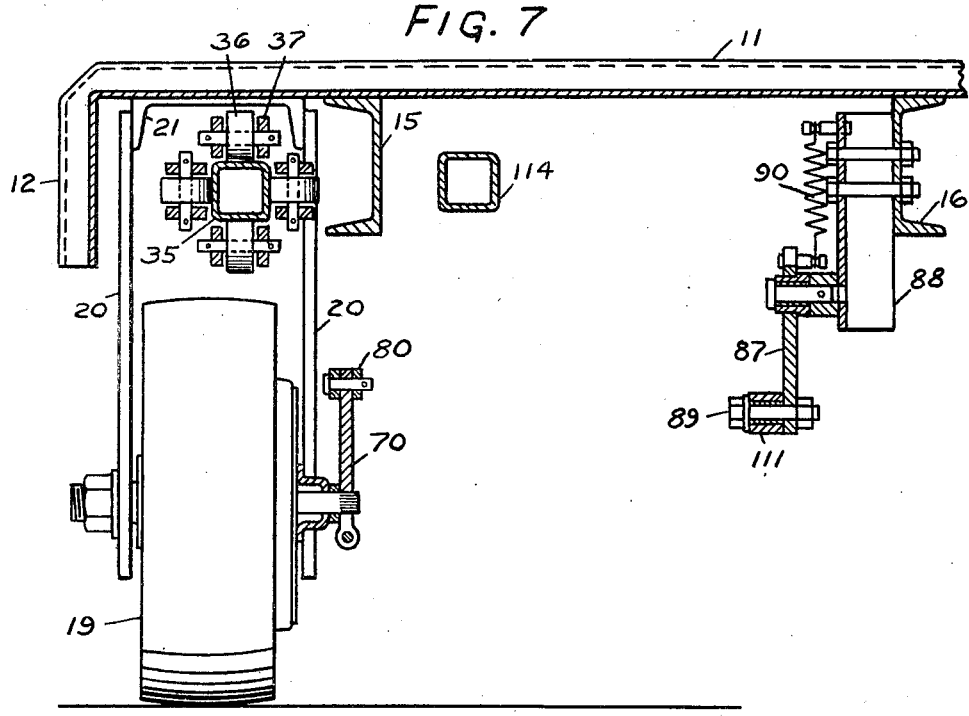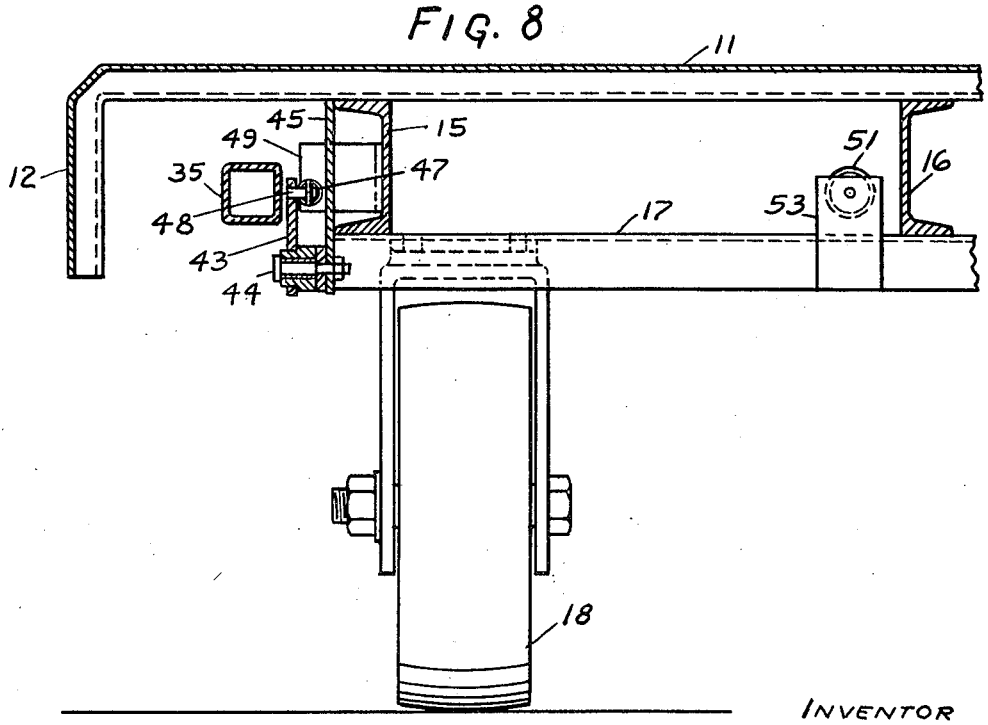

3,503,338
Patented Mar. 31, 1970

3,503,338
SUBFLOOR CONVEYOR TOW TRUCKS
Paul Klamp, 22730 St. Joan Ave.,
St. Clair Shores, Mich. 48080
Filed Mar. 21, 1968, Ser. No. 714,879
Int. Cl. B61b *13/00;* B61c *11/00*
U.S. Cl. 104—172                                 9 Claims

ABSTRACT OF THE DISCLOSURE

The invention relates to subfloor conveyor tow trucks which are adapted for having one truck pushing another from a chain powered main line into a non-powered spur line into which the first of the two trucks was diverted through a switch plate or tongue in response to a signal carried by the first truck, and which are adapted to be accumulated in one or more of the main conveyor runs behind a truck stop which is moved into the path of the trucks for accumulation and retracted for releasing the accumulated trucks.

---

In one case a truck is adapted to push another one which has been disengaged from the drive chain in a sideways direction, and in another case it is adapted to be halted by a truck stop on the main line or behind a truck which has been stopped there.

Heretofore this dual function has been achieved by the use of two separate front bumpers, a pushing bumper and an accumulation bumper, vertically spaced apart, and by two corresponding rear bumpers, one of which is usually a fixed surface near the end of the truck body and the other a movable member.

The main object of this invention is to provide a simpler tow truck by having only one bumper in front and one in back. The front bumper serves in the dual capacity of a pushing and accumulation bumper, while the rear bumper interacts with the front bumper of the succeeding truck in pushing as well as in accumulating.

Another important object of the invention is to provide positive means for avoiding truck separation at the front of a group of accumulated trucks after the truck stop has been retracted. This separation often occurs when the trucks are not too heavy and the front truck is empty or lightly loaded.

After the truck stop has been retracted, the accumulation bumper at the front of the first truck returns to its forward position as it should, thus causing the tow pin to be lowered and the brakes to be released. But the pressure of the springs which return the accumulation bumper of the second truck to its forward position bears against the rear of the first truck and often causes it to move forward. As a result, the accumulation bumper of the second truck returns to its forward position, too, causing its tow pin to be lowered and its brakes to be released. If now the next approaching main line pusher dog happens to be behind the second tow pin, the dog will propel the second truck and it, in turn, will push the first truck along, since the bumper mechanism of the latter is now in the push position. This doubling up of a pair of trucks in motion on the main line can cause jams and even have serious consequences on a downhill grade. Therefore special provisions are needed, often including sensing devices for spotting a doubled-up pair of trucks. Doubling up can occur with any subsequent pair of trucks in the accumulation area, too. One remedy for this condition on the truck itself has been successfully applied, but it involves an additional bumper-like member in the front of the truck, so that the latter has three bumpers out front and two in back, with four of the five being movable parts. In comparison, the truck according to the invention employs a total of only two bumpers as noted before.

A still more important object of the invention is to provide positive means for preventing doubling up due to another cause, effecting empty, loaded, light and heavy tow trucks alive. This doubling up occurs when only one of a group of trucks that were accumulated is left standing. The moment the preceding truck had moved away, the accumulation bumper of the remaining truck had moved forward, putting its front and rear bumpers into pushing position. If the next approaching chain pusher dog is towing a truck, the latter will push the previous one along, and thus doubling up is the result. No remedy for this condition has been shown so far in any known system employing pushing and accumulating of trucks.

Whereas subfloor tow conveyor trucks usually are provided with rear wheel brakes and other means for cushioned stopping when encountering a stop or other obstacle, the start of stationary trucks by a moving pusher dog is not always effectively cushioned. An effective method of such cushioning was disclosed in Patent No. 3,015,284, issued to the inventor. It is the object of the invention to connect this type of cushioning means to both, the tow pin and the rear bumper, so that it comes into play not only when the tow pin of a stationary truck is engaged by a moving pusher dog, but also when a stationary truck is engaged from behind by a moving truck. It further comes into play when stopping a truck against another on a sloping spur line.

The fifth and final object of the invention is to provide a simple means for preventing accidental lifting of the tow pin when the truck is moved up or down a slope by the conveyor chain.

The foregoing objects will become more apparent as this description proceeds, especially when considered in connection with the accompanying drawings illustrating a preferred embodiment of the invention, wherein:

FIG. 1 is a top plan view of a truck incorporating the improvements of the invention, with its platform and the top of its tow pin housing cut away according to line 1—1 of FIG. 2;

FIG. 2 is a view in vertical longitudinal section on line 2—2 of FIG. 1;

FIG. 3 is a view in vertical longitudinal section on line 3—3 of FIG. 1;

FIG. 4 is a view in horizontal section on line 4—4 in FIG. 2;

FIG. 5 is an enlarged partial view in transverse vertical section on line 5—5 of FIG. 2, showing one side of the truck, the other side being substantially symmetrical;

FIG. 6 is an enlarged partial view in transverse vertical section on line 6—6 of FIG. 2, showing one side of the truck, the other side being substantially symmetrical;

FIG. 7 is an enlarged view in transverse vertical section on line 7—7 of FIG. 2, showing one side of the truck, the other side being substantially symmetrical, except as noted in the following description;

FIG. 8 is an enlarged view in transverse vertical on line 8—8 in FIG. 3, showing one side of the truck, the other side being substantially symmetrical, except as noted in the following description.

TRUCK FRAME

The improved subfloor tow truck or load carrier of the invention is generally designated by the reference numeral 10. The frame of the truck includes a deck or platform 11 which is corrugated for added strength. On each side it has a bent-down skirt 12 which provides longitudinal rigidity to the deck. U-shaped cross members 13 and 14 are welded to the underside of the deck in front and back and to the skirts 12, thus providing a strong, box-like deck structure. Also welded underneath the deck are two longitudinal channels 15 and a central channel 16. A channel-shaped cross member 17

(FIGS. 1 and 2) is welded to the underside of channels 15 and 16.

Two swivel casters 18, serving as front wheels, are bolted to the underside of cross member 17. Each of two rear wheels 19 is mounted between two plates 20 which are welded to the flanges of an inverted channel 21 that is fastened to the underside of deck 11 (FIGS. 1 and 3).

TOW PIN HOUSING

As shown in FIG. 1 and FIG. 2, a tow pin housing 22 is welded to the cross member 13. The parts forming this housing are welded together and consist of a U-shaped body 23, top plate 24, bottom plate 25 and tow pin guard 26 which is bent into semi-circular shape. The top plate 24 has a round hole for the tow pin 27, with a notch 28 to one side of the hole for the passage of a pin 29 extending sideways from the tow pin. When the latter is lifted for removal of the truck from the conveyor line, it is turned after pin 29 passes through notch 28, the tow pin now being held up. The bottom plate 25 is provided with an elongated hole 30 which guides the lower part of the tow pin for forward movement, the purpose of which will be explained hereinafter. A collar 31 at the upper end of the tow pin keeps it from dropping down. A handle 32 is welded to the top of the tow pin. For automatic lifting of the tow pin, a collar 33 is welded to it.

FRONT BUMPER ASSEMBLY

The front bumper assembly consists mainly of a bumper bar 34 and, welded to it, two square tubes 35 which can be seen in their full length in FIG. 3. Each of the two tubes is guided near its rear end by four ball bearing rollers 36, mounted in a housing 37 which is bolted to a diaphragm 38 that is welded to the truck frame. As shown in FIG. 6, a hole 39 is provided in each diaphragm to allow tube 35 to pass through with clearance. The housing 37 has the same size hole. Another roller guide for each tube 35 of a different arrangement is placed near the front of the truck frame. Two side guide rollers 40 are mounted on an angle 41 which is fastened to the cross member 13 and is cut out for passage for tube 35 as shown in FIG. 1. In FIG. 3 it is seen that a third roller 42 supports each tube 35. This roller is mounted on a bell crank 43, pivoted at 44 to a plate 45 which is welded to channel 15 as shown in FIG. 8. Referring to FIG. 3, this bell crank is supported against counterclockwise turning by an adjusting screw 46. One end of a tension spring 47 is hooked to a pin 48 in bell crank 43 and the other end is fastened to bracket 49 which is welded to channel 15 (FIGS. 8 and 3). Thus the spring tends to turn the bell crank 43 clockwise for partial counterbalance of tube 35 and bumper 34, so that it takes but a light touch to lift bumper 34. The top of tube 35 is not held down by a guide roller near the cross member 13 in order to permit such lifting of the bumper, whereas each tube 35 is guided near its back end in an up and down and sideways direction by rollers 36.

In order to lend rigidity to the assembly of bumper 34 and tubes 35, a cross brace 50 is bolted to these tubes and spans across the space between. One end of a tension spring 51 is fastened to an angle 52 that is welded to the cross brace, while the other end is fastened to a strap 53 which is welded to the stationary frame member 17 (FIGS. 1 and 2). Therefore the spring 51 urges the front bumper assembly forwardly. Such forward motion is limited by a roller 54, mounted on a plate 55 which is welded to channel 16, when cross member 50 comes to bear against the roller (FIGS. 1 and 2). Backward motion of the front bumper assembly is limited by frame cross member 14 when the rear end face 56 of each tube 35 comes to bear against this cross member.

Welded to the front of the frame cross member 13, over each tube 35 is a stop plate 57. When the front bumper is in the fully extended position as shown in the illustrations, immediately in front of each stop plate 57 a stop bar 58 is welded to the top of each tube 35. If now the front bumper is tilted up it can move backwards but a very small distance, because stop bars 58 are stopped by stop plates 57. When the front bumper is in its lower position it can be moved backwards all the way until the end faces 56 of the tubes 35 are halted by frame cross member 14. The central cut-out portion in each angle 41 is allowing passage for stop bar 58 when the front bumper is in its lower position. An opening 59 is cut into frame cross member 13 for each tube 35 to allow it and stop bar 58 to pass through when the front bumper is in its lower position. It can be seen that the front bumper, when in its extended position, can be shifted from its lower normal position to an upper position where it is locked against backward movement, or it can be moved backwards while in its lower position.

TOW PIN LIFT CAMS

When the front bumper is in its normal, extended position and is stopped by an obstacle, the continuing forward motion of the truck produces a backward motion of the bumper relative to the truck. During this motion the tow pin is to be lifted clear of the pusher dog 60 which is propelled by the conveyor chain in the direction of arrow 61 and is provided with a hinged hold-back dog 62. For this purpose two cams 63 are provided. They are welded to a common hub 64 which is pivoted on a pin 65 that is held in two diaphragms 66 which are welded to the front bumper. The rear end of each cam 63 rests on one of two rollers 67 that are mounted between two plates 68, welded to the tow pin housing 23. When the front bumper moves backwards relative to the truck, the cams 63 contact the underside of tow pin collar 33 and lift the tow pin until the dwell portions 69 of cams 63 ride up onto the rollers 67 at which time the tow pin is clear of the pusher dog 60.

REAR WHEEL BRAKES

To stop the momentum of the truck when the tow pin is lifted and to hold it in place afterwards, each rear wheel 19 has an internal brake operated by a brake lever 70, the upper end of which has to be moved backwards to apply the brake. For this purpose a brake cam 71 is bolted to each of the two tubes 35. A cam shaft 72 is mounted in two bearings 73 one of each in a plate 74. The two plates 74 are bolted to the respective channels 15. The outline of plates 74 can be seen in FIG. 2. On each end of shaft 72 a bell crank 75 is mounted with a key and set screws. Each bell crank carries a cam follower roller 76 which causes it to be turned clockwise (FIG. 3) when the front bumper with tubes 35 and 71 moves backwards. At 77 a swivel block 78 is pivoted to each bell crank 75. Passing through a hole in the swivel block is a connecting rod 79 on which a clevis 80 is fastened for a pivot connection to brake lever 70. On a threaded portion of rod 79 two nuts 81 are locked against each other. Between a washer 82 and the rear face of swivel block 78 a compression spring 83 is mounted around rod 79 to apply braking pressure to brake lever 70 when bell crank 75 turns counterclockwise. Spring 83 overcomes the lighter force of a brake release spring which is built into the rear wheel brake and tends to turn the brake lever counterclockwise. Two nuts 84 on the left end of rod 79 serve to pull the rod to the left again when the bell crank turns clockwise to release the brake at a later time.

Near the center of cam shaft 72 a latch lever 85 is fastened to the shaft by a key and set screws (FIGS. 1 and 2). A locking tooth 86 is engaged by a pawl lever 87 which is pivoted to a bracket 88 at 89, the bracket being welded to channel 16. The pawl lever is urged to turn in a counterclockwise direction by a tension spring 90. When the cam shaft 72 is turned counterclockwise through cam 71, roller 76 and bell crank 75, the tooth 86 of latch lever 85 moves in an upward arc until the end face 91 of the pawl lever 87 moves in under the tooth to lock the cam shaft 72 against clockwise movement, so that the rear wheel brakes remain applied when the front bumper is released for return to its extended position and the brake cams 71 release the rollers 76. The method of releasing the brakes will be described in a later paragraph.

TOW PIN SNUBBER

When a pusher dog 60 (FIG. 2) engages the tow pin to start the forward motion of the truck, a tow pin snubber assembly 92 provides gradual acceleration of the truck. The tow pin passes through a hole in a strap 93 which is supported by a bolt 94 and a washer 95. A spacer 96 is placed around the bolt and inside an elongated hole 97 in strap 93. Thus the latter is guided for forward motion when the lower end of the tow pin is swung forward. This forward motion is limited by the length of the elongated holes 30 and 97. To resist such motion, a hyrdaulic shock absorber 98 is fastened at one end to the formed end 99 of the strap 93. The rear end of the shock absorber is fastened to the forward end 100 of a second strap 101. As shown in FIGS. 2 and 4, the rear end of this strap is slitted and bent around a bolt 102. Placed in the slit is the lower end of an arm 103 of a support for the rear bumper assembly to be described in a later paragraph. A bushing 106 in arm 103 allows for hinge motion between the arm and strap 101. An angle 107 is bolted to strap 93, while an angle 108 is bolted to strap 101. The ends of two tension springs 109 are fastened to the angles 107 and 108. Thus the forward swinging of the lower end of the tow pin is resisted both, by the shock absorber and the two tension springs. This resistance furnishes the required acceleration force for the truck. After acceleration, with the truck in steady motion, the pressure of dog 60 against the tow pin is light, so that the two springs 109 will be of ample capacity to return the bottom of the tow pin to the rear of slot 30. If, before restarting, a truck had been stopped by the front bumper moving backwards relative to the truck, the brakes are applied to the rear wheels and latched in this condition by the pawl lever 87. Therefore it is necessary to release the brakes when a tow pin is engaged by a pusher dog 60. This is accomplished during the first small part of the forward swinging motion of the lower end of the tow pin. The brake latch is released through a connecting rod 110 which is held at its left end by the angle 107 and hinged at its right end to the pawl lever 87 through a rod end 111 with a slightly elongated hole 112. During the full forward travel of strap 93 the pawl lever swings through a large arc. The first small portion of this arcuate motion is sufficient to release the brakes. The remainder of the motion is overtravel.

REAR BUMPER ASSEMBLY

The rear bumper assembly 105 is of welded construction and consists of the rear bumper 113, two rectangular tubes 114 and three reinforcement bars 115. The front end of each tube 114 is hinged at 116 to two arms 117 of the rear bumper support 104. The arms are welded to a tube 118. Set into the ends of this tube are plugs 119 which are welded to the tube ends and are turned down to form journals 120 that are supported for hinged rotation in bushings 121, mounted in the plates 74 (FIGS. 1 and 6). The arms 116 are normally held against stops 122 by the springs 109 of the tow pin snubber assembly 92. Near the rear end of the truck each tube 114 is guided by two side rollers 123 and one top roller 124, mounted in a housing 125 which is bolted to the cross member 14. For the support of the rear of each tube 114 a roller 126 is mounted on a bell crank 127 which is pivoted at 128 to a plate 129 that is welded to channel 15. For clarity, plate 129 is not shown in FIG. 2. A tension spring 130 urges the bell crank to rotate in a counterclockwise direction, thus pressing roller 126 against a roller track 131 (FIG. 5) which is bolted to the tube 114, together with a bottom track 132. The lifting force of the two springs 130 is greater than the weight of the rear bumper assembly, so that the upward pressure of rollers 126 forces the tubes 114 against the upper guide rollers 123, producing a substantial overbalance of the weight of the rear bumper.

From this upper, normal position the rear bumper is shifted vertically to a low position when the truck accumulates against another, or against a stop or an obstacle when the brakes are applied as described, through counterclockwise turning of bell crank 75. To lower the rear bumper, the left end of a push rod 133 connects to bell crank 75 at stud 134 where the connecting rod end 135 has a slotted hole 136 (FIG. 3), while the right end of the push rod is hinged to bell crank 127 at 137 (FIG. 3). When the brakes are applied and latched through pawl lever 87, the rear bumper will remain in its lower position until the latch is released at the time when the tow pin is engaged by a conveyor pusher dog. When the rear bumper is contacted by the front bumper of another truck, regardless of whether the rear bumper is in its upper or lower position, it will yield by moving forward until the reinforcement bars 115 bear against the cross member 14 while the rear bumper support 104 turns counterclockwise and exerts a pull on the tow pin snubber assembly 92, so that the latter cushions the forward motion of the rear bumper and returns it to its extended position when pressure against it is released.

SPECIAL SHAPE OF BOTTOM END OF TOW PIN

When a tow truck carrying a heavy load moves up on a sloped portion of the conveyor, a tow pin with lost motion for cushioning the starts as described, moves up to its forward position at its lower end so that the tow pin will assume a slanted position, its bottom end leading. With the conventional cylindrical shape of the tow pin, the result is that the towing pressure of the pusher dog against the tow pin has an upwardly inclined direction with reference to the inclined floor level. It has been found that on rare occasions such a tow pin has worked itself upwards in such areas until it was free of the pusher dog. Now the truck stopped and then ran backwards down the slope, causing damage and threatening the safety of the personnel. Special locking devices have been employed to prevent the tow pin from lifting up in such cases. In order to avoid the expense of such devices, the invention provides that, for installations including sloped floor areas, the bottom end 138 of the tow pin 27 is in the form of a truncated cone, with the larger diameter of the cone located at the bottom end of the tow pin. The angle of the cone is so that, in combination with the configuration of the pushing faces of pusher dog 60 and hold-back dog 62, the pressure between tow pin and dog does not have an upward component, regardless of whether the truck is moving up or down a slope. Without such upward component of the tow pin pressure, accidental lifting of the tow pin is avoided.

OPERATION

(A) Pushing

When a tow truck as described is moved along the conveyor path by a pusher dog, both bumpers are in their normal positions. The front bumper is in its lower position and the rear bumper in its upper position, with both bumpers being extended. When the truck is shunted off into a spur line through a switch tongue in response to a signal of known design, carried by the truck on its front cross member but not shown in the illustrations, the tow pin is released by the pusher dog in a sideways direction, but the truck is not moved clear of the main line traffic. At this time both bumpers are still in their normal positions. The front bumper of the next truck moving along the main line approaches the rear bumper of the stationary truck as indicated in FIG. 2 where 34a is the front bumper of the moving truck and 113 the rear bumper of the stationary truck. Since it takes but a light touch to lift the partially counterbalanced front bumper 34a, its inclined portion 139 will ride up on the inclined part 140 of rear bumper 113. Thus bumper 34a is shifted upwardly to its locked or pushing position and will push the stationary truck clear of the main line traffic after the front face 141 of the bumper 34a comes to bear against the surface 142 of bumper 113. The latter will now move forward before the truck itself begins to move and exert a pull on the snubber assembly 92, thereby cushioning the impact. When the second truck is clear of the first, the bumper 34a is shifted back to its lower position by gravity. When another truck is pushed into the same spur before the first one has been removed manually, it pushes the first one farther along in the same manner as described, except that surfaces 141 and 142 may remain in contact with each other after the two trucks have come to a stop.

Longer spur lines without a drive chain are usually sloped downwardly, because a larger number of trucks cannot be readily pushed along as a group. In this case a subfloor stop is employed to stop the first truck. When others coast down the line, each will contact the last one in the stationary group in the same manner as when a truck pushes another, the cushioned rear bumper absorbing the shock from stopping the truck. All tow pins of the accumulated trucks will remain in their down position. Since there is no conveyor chain, it is not necessary to lift them.

(B) Accumulating

For accumulation of trucks on a chain driven main line, a retractable truck stop is employed. This stop has a vertical stopping surface so that the front bumper of an approaching truck is not lifted. As the front bumper 34 is halted, it moves backwards in relation to its truck until the tow pin is lifted, the brakes are applied and latched and the rear bumper is shifted downwards to its accumulation position before the truck comes to a stop. This down position of the rear bumper is shown at 113a in FIG. 3. It is seen from this illustration that the front bumper 34 of a second approaching truck will not be lifted upon contact, but merely stopped in relation to the still moving second truck. Therefore the latter will come to a stop in the same way as described in the foregoing for the first truck arriving at the retractable truck stop. The same kind of action is repeated for every additional truck that approaches. As each truck is stopped behind another through the action of its brakes after the tow pin has been lifted, a further softening of the impact results from the yield of the rear bumper of the preceding truck, provided by its snubber assembly 92.

When the truck stop is retracted after a number of trucks has been accumulated, the front bumper of the leading truck is extended forwardly through spring 51, causing the tow pin to drop to its down position. The brakes, however, remain applied due to latch lever 85 and pawl lever 87. For the same reason and also on account of its engagement with the front bumper of the second truck, the rear bumper cannot move to its upper or pushing position. The brakes of the truck which is released by the stop prevent the spring 51 of the second truck from extending its front bumper and pushing the first truck along accidentally. Therefore it is impossible for the tow pin of the second truck to drop until the first truck has been moved away by a pusher dog, at which time the brakes of the first truck are released as described.

The brakes of even the last truck of an accumulated group will remain applied until a pusher dog engages its tow pin. Therefore, if such a pusher dog is propelling a truck, the latter will first accumulate behind the remaining one. Now the pusher dog is released from the truck that approached and moves on to engage the tow pin of the last truck of the group.

In this manner the object of preventing one truck from pushing another along the main line as a result of separation of the first two trucks of an accumulated group, or as a result of reverting the bumpers of a last remaining truck of such a group to pushing position, is achieved.

MODIFICATION

With a slight modification of the design of the truck, it can be arranged that, instead of the bottom positions, the top positions of the bumpers are for accumulation, and the bottom positions for pushing. Both bumpers still have a vertical shift motion as well as a longitudinal motion as described. It is intended that the claims cover such a modification.

What I claim as my invention is:

1. A pushing and accumulating tow truck for subfloor tow conveyors, comprising:
   a body mounted on four wheels that ride on the floor,
   a tow pin mounted at the front end of the body and extending downwardly through a slot in the floor, the bottom end of the tow pin adapted to be engaged by a chain driven pusher dog,
   a front bumper having a normal, accumulating position from which it can be moved backwards relative to the truck, or shifted vertically to a pushing position where it is locked against such backward movement,
   means for lifting the tow pin out of engagement with said pusher dog during backward movement of the front bumper,
   a rear bumper having a normal, pushing position,
   and connecting means between the front and rear bumpers for vertical shifting of the rear bumper from its pushing position to an accumulating position when the front bumper is moved backwards.

2. A tow truck according to claim 1 in which the front and rear bumpers are shaped so as to cause vertical shifting of the front bumper of a moving truck from its normal, accumulating position to its pushing position upon contact with the rear bumper of a stationary truck when such rear bumper is in its pushing position, in order to cause the moving truck to push the stationary truck along after contact has been made.

3. A tow truck according to claim 1 in which the front and rear bumpers are shaped so as to cause backward motion of the front bumper of an approaching truck, relative to said approaching truck, upon contact with the rear bumper of a stationary truck when said rear bumper is in its accumulation position, in order to cause the tow pin of the approaching truck to be lifted clear of said chain driven pusher dog and thus cause the truck to be halted for accumulation upon contact with the stationary truck.

4. A tow truck according to claim 3, including rear wheel brakes and connecting means between said front bumper and rear wheel brakes, adapted to apply the brakes when the front bumper is moved backwards.

5. A tow truck according to claim 4 in which said tow pin is mounted for limited lost motion in the direction of movement of the truck, including:
   snubber means opposing the lost forward motion of the tow pin, said snubber means comprising a hydraulic shock absorber and spring means, said snubber means yielding in order to cushion the start of the stationary tow truck when its tow pin is engaged by said pusher dog,
   a brake latch for keeping the brakes applied after the front bumper has returned from its rearward to its forward accumulation position,
   and connecting means between the tow pin and said brake latch for releasing the latch during the first portion of the forward lost motion of the tow pin of a stationary truck when the tow pin is engaged by said pusher dog.

6. A pushing and accumulating tow truck according to claim 5 in which the rear bumper is mounted for forward motion where, through structural connecting means, said forward motion is resisted by the same snubber means which resists the forward lost motion of the tow pin, so that said rear bumper cushions the impact caused when a stationary truck is contacted by a moving truck in order to be pushed, or when a stationary truck causes an approaching truck to be accumulated.

7. A tow truck comprising:
a body mounted on four wheels that ride on the floor,
a tow pin mounted at the front end of the body and extending downwardly through a slot in the floor, said tow pin mounted for limited lost motion in the direction of movement of the truck and adapted to be engaged and disengaged by a chain driven pusher dog to propel said tow truck when so engaged,
snubber means opposing the lost forward motion of the tow pin,
said snubber means comprising a hydraulic shock absorber and spring means, yielding in order to cushion the start of the stationary tow truck when its tow pin is engaged by said pusher dog,
a front bumper mounted for backward movement relative to the tow truck, with such backward movement being opposed by a spring,
connecting means between the front bumper and the tow pin for lifting the tow pin clear of the pusher dog during the backward movement of the front bumper,
rear wheel brakes,
connecting means between said front bumper and rear wheel brakes, adapted to apply the brakes when the front bumper is moved backwards,
a brake latch for keeping the brakes applied after the front bumper has returned to its forward position,
and connecting means between the tow pin and the brake latch for releasing the latch during the first portion of the forward lost motion of the tow pin of a stationary truck when the tow pin is engaged by said pusher dog.

8. A tow truck according to claim 7 in which the diameter of the tow pin at its extreme bottom end is larger than the diameter of the portion immediately above the extreme bottom end.

9. A tow truck according to claim 7 in which the bottom end of the tow pin is in the form of a truncated cone, with the larger diameter of the cone being at the bottom end.

References Cited

UNITED STATES PATENTS

| | | | |
|---|---|---|---|
| 3,103,895 | 9/1963 | Bradt et al. | 104—172 X |
| 3,415,200 | 12/1968 | Bishop et al. | 104—178 X |

MILTON BUCHLER, Primary Examiner

G. E. A. HALVOSA, Assistant Examiner